United States Patent [19]

Kessler

[11] Patent Number: 4,946,727
[45] Date of Patent: Aug. 7, 1990

[54] DUAL DUROMETER RUB RAIL

[76] Inventor: Gerald Kessler, 302 McClurg Rd., Youngstown, Ohio 44501

[21] Appl. No.: 320,447

[22] Filed: Mar. 8, 1989

[51] Int. Cl.⁵ .............................................. B32B 3/06
[52] U.S. Cl. ..................................... 428/99; 428/217; 428/220; 428/100; 428/31; 52/718.1; 52/717.1; 24/297; 293/128
[58] Field of Search ................... 428/31, 99, 100, 217, 428/220; 52/717.1, 718.1; 293/126, 128; 24/297

[56] References Cited

U.S. PATENT DOCUMENTS

| | | | |
|---|---|---|---|
| 3,179,397 | 4/1965 | Cleereman et al. | 267/1 |
| 3,472,546 | 10/1969 | Samuels | 293/1 |
| 3,685,231 | 8/1972 | Blose | 52/717.1 |
| 3,897,095 | 7/1975 | Glance et al. | 293/71 P |
| 3,897,967 | 8/1975 | Barenyi | 428/31 |
| 3,979,110 | 9/1976 | Newton | 267/140 |
| 4,188,765 | 2/1980 | Jackson | 52/716 |
| 4,246,303 | 1/1981 | Townsend | 428/31 |
| 4,292,913 | 10/1981 | Siebert et al. | 114/219 |
| 4,346,205 | 8/1982 | Hiles | 528/53 |
| 4,349,592 | 9/1982 | Nussbaum | 428/31 |
| 4,366,196 | 12/1982 | Maekawa et al. | 428/217 |
| 4,427,189 | 1/1984 | Kimura et al. | 428/31 |
| 4,708,894 | 11/1987 | Mabuchi et al. | 428/31 |
| 4,810,550 | 3/1989 | Gasser | 428/217 |

Primary Examiner—Alexander S. Thomas
Attorney, Agent, or Firm—Browdy and Neimark

[57] ABSTRACT

A rub rail assembly includes a rub rail support channel member suitably attached, such as by screws or the like, to a surface to be protected, and a rub rail member which is engaged with the rub rail support member. The rub rail member in turn is formed of two relatively thin layers dual durometer co-extruded, the upper layer being soft plastic and the bottom layer being stiff plastic. The thickness is sufficiently small so that the rub rail member can be coiled prior to installation, and so that it can be deformed transversely to a generally hemi-cylindrical shape for engagement with the rub rail support member.

14 Claims, 2 Drawing Sheets

DUAL DUROMETER RUB RAIL

FIELD OF THE INVENTION

The present invention relates to a rub rail for protecting wall surfaces and the like from abrasions and impacts, and more particularly to a rub rail construction having at least two layers of material possessing different durometer values, where the outermost layer of the rub rail is capable of maintaining an aesthetically pleasing appearance throughout the useful life of the rub rail.

BACKGROUND OF THE INVENTION

Rub rail assemblies of the kind with which the present invention is concerned typically include a somewhat absorbent rub rail, made of a material such as rubber or plastic, and a metal channel strip support which may be extruded aluminum to which the rub rail is appropriately attached. Rub rail assemblies of this kind are used principally to protect wall surfaces, equipment, etc. which in ordinary use are subjected to repeated frequent and abusive impacts or abrasions, such as vehicle doors and fenders, marine docks, supermarket checkout counters and cases including refrigeration cases, shelving, display tables, refrigeration equipment, etc.

Typically, rub rail assemblies known today (see FIG. 1 of the drawings) include the rub rail supporting channel strip 1, and the extruded rub rail 2 member secured to the channel strip by means of a pair of hollow leg members 3, 4 or other such interlocking elements. Each of the leg members are deformably engaged by a correspondingly configured rigid jaw 5,5' or 6,6' formed in the channel strip. The channel strip 1, like the plastic or rubber impact-absorbing member 2, is ordinarily and most advantageously provided and used as an extrusion, with both members being cut or otherwise formed with substantially the same length.

Until recently, little if any effort was made to give the impact-absorbing rub rail extrusions any personality or character. The industry apparently understood that, because of the frequent and abusive impacts and abrasions received by the outer, object-contacting surfaces of the rub rail, any layers of paint or other aesthetic-enhancing material carried by those surfaces would, in a very short period of time, be rubbed, chipped or scratched off, or otherwise removed. Therefore, impact-absorbing extrusions were primarily formed of a dull black or dark-colored rubber or soft plastic material.

Recently, in connection with commercial uses and environments, it has become fashionably desirable to use rub rails which possess enhanced aesthetics, and in particular a brightly colored exterior surface. Such desired coloring has been achieved by adding a coloring substance, e.g. a suitable dye or pigment, to the rubber or plastic material prior to extrusion of the rub rail.

In performing this step in the extrusion process, it has been found nearly impossible to produce extrusions having consistent excellence in appearance while still maintaining close dimensional tolerances in extrusions of unbalanced cross section, especially using rubber or soft plastic. These soft products, being relatively thick, e.g. on the order of 0.175 to 0.325 inches, have a tendency during extrusion to form sink marks and "alligator" skin. One attempted solution for these production problems has been to extrude rub rails of more rigid material. Such rigid materials, however, have proven to be less than desirable because, once formed into extrusions, they have a marked tendency to crack during use. The result is a rub rail which in a very short amount of time exhibits unappealing cracks, and which also tends to catch on clothing and poses the potential problem of creating safety hazards.

To avoid this problem, it has been found necessary to use extremely expensive materials, such as polycarbonates, but this solution also is undesirable since the costs of production are greatly increased. Rigid materials, including both the more expensive polycarbonates and the like as well as less expensive plastics, suffer from another defect as well, i.e. these are stiff and can only be handled as either long and unwieldy and difficult to handle elements, or as a plurality of short pieces, both forms increasing installation costs.

SUMMARY OF THE PRESENT INVENTION

It is therefore an object of the invention to overcome or at least alleviate deficiencies in the prior art, such as those indicated above.

It is another object of the present invention to provide an inexpensive rub rail construction which will provide an aesthetically appealing, consistently colored exterior, while preventing aesthetically unappealing and hazardous cracking or chipping, and which is relatively easy to handle and inexpensive to install.

Yet another object of the present invention is to provide a rub rail which can be extruded with consistency in dimensional tolerance while distribution of added coloring is uniformly maintained.

Still another object of the present invention is to provide a rub rail constructed of at least two layers of material, each layer having a different durometer value, with both layers being thin and the outermost layer of material being relatively flexible and including a coloring substance dispersed substantially uniformly throughout.

A further object of the invention is to provide a rub rail assembly which, compared with the prior art rub rail assemblies, can be constructed at a much lower cost, while presenting a smooth, non-interrupted and aesthetically pleasing appearance.

Yet a further object of the invention is to provide a suitable rub rail member which is less costly to install.

BRIEF DESCRIPTION OF THE DRAWINGS

The above and other objects and the nature and advantages of the present invention will become more clearly understood from the following detailed description when read in light of the accompanying drawings, wherein:

FIG. 1 presents a cross-sectional view of the rub rail and channel strip assembly shown in perspective view in FIG. 2;

DETAILED DESCRIPTION OF THE INVENTION

Figure 1:
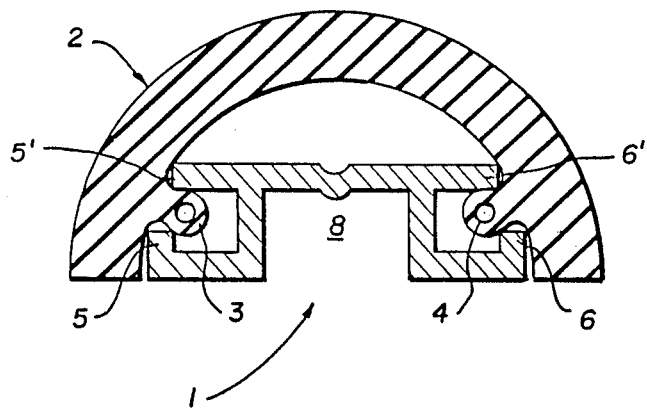
FIGS. 1 and 2 illustrate a rub rail assembly typical of the kind of assemblies known in the prior art, where
Figure 2:
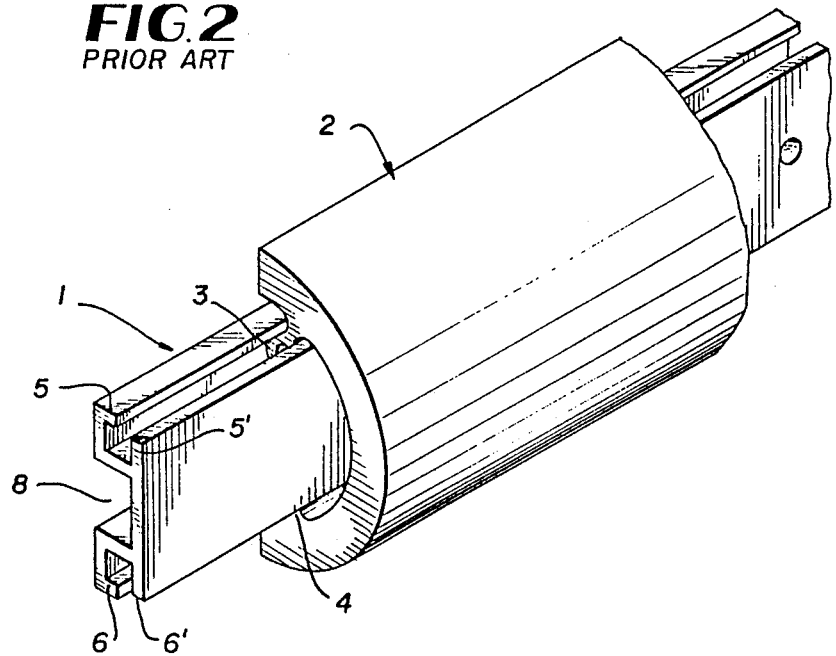
Figure 3:
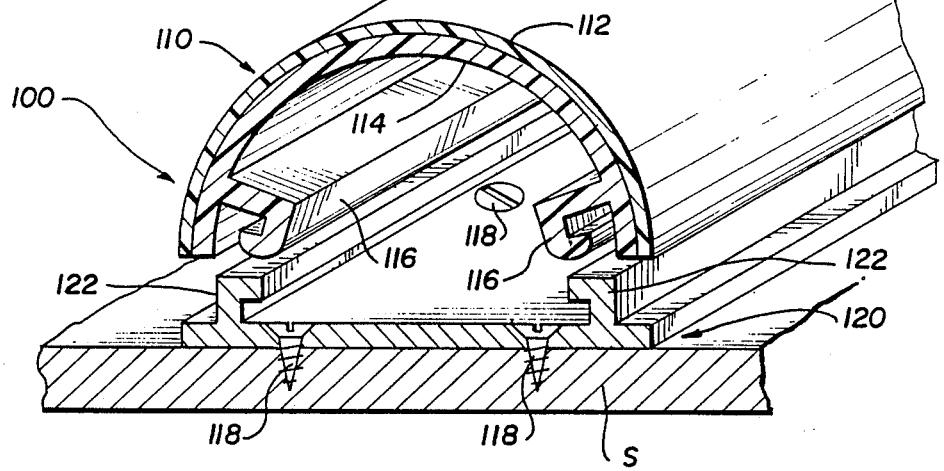
FIG. 3 is a slightly exploded cross sectional view of the rub rail assembly of the present invention, showing both the rub rail and the channel strip to which the rub rail is to be attached.

Referring now to FIG. 3 of the drawings, there is shown a preferred embodiment of a rub rail assembly 100 constructed in accordance with the principles of the present invention. As shown, the rub rail assembly 100 includes a composite material rub rail member 110 and a channel strip support member 120. The channel strip member is secured by appropriate attachment means (e.g., threaded fasteners 118 in the form of screws as shown by way of example in FIG. 3) to an underlying support surface S, such as the wall which is to be protected.

The rub rail member 110 includes a dual layered composite structure comprising a first "outer" layer 112 and a second "inner" layer 114. Formed unitarily with, and projecting radially inwardly from the inner layer 114 are a pair of arms 116, 116. This pair of arms is configured for engagement With or Within appropriately configured rub rail securing means 122, 122 on the channel strip member, such that when the rub rail member 110 is secured to the channel strip member 120, a substantially cylindrical shape is imparted to the rub rail member 110 and the volume encompassed by the so engaged rub rail member and channel strip member is that of one-half of a cylinder. It is to be understood that the arms 116, 116 projecting from the rub rail are preferably formed as latching arms, and that the rub rail securing means 122, 122 are preferably formed as latching hooks. It is further to be understood that the configurations of the arms 116, 116 and the securing means 122, 122 as shown in FIG. 3 are purely exemplary and are by no means intended to limit the manner in which engagement of the rub rail and the channel strip member can be effected. Any and all other configurations of the arms and the securing means are contemplated by the present invention insofar as the essence of the invention does not reside in any one particular configuration of the cooperating arms and securing means.

The first and second layers 112, 114 of the rub rail member 110 are unitarily formed during extrusion of rub rail member, such as by dual durometer extrusion. Preferably, the first layer 112 of the rub rail composite extrusion 110 is a soft and flexible plastic material or elastomer having a first durometer value typically 65-95 Shore A, and the second layer 114 of the rub rail composite extrusion 110 is a rigid plastic material having a second durometer value greater than the durometer value of the first layer. More specifically, the first layer 112 preferably consists of a high tensile strength, abrasion resistant, flexible polyvinyl chloride (PVC) material, while the second layer preferably consists of a hard and relatively rigid plastic, such as high impact or so-called "unplasticized" polyvinyl chloride (PVC).

By this combination of materials, the inner second layer 114 forms the structural foundation, while the outer first layer 112 forms the aesthetically pleasing and shock absorbing cover for the rub rail coextrusion. In this manner, should the inner second layer 114 sustain any cracks during use, the outer first layer 112 will effectively cover them and guard against any safety hazards which might otherwise arise if such imperfections were exposed. As long as the first layer is flexible and of lesser hardness than the second layer, the rub rail co-extrusion contemplated by the present invention can exhibit any combination of properties mentioned above. Also, because the flexible layer formed is much thinner than in prior art constructions, extrusion problems are considerably diminished, with uniformity being improved and problems such as sink marks and "alligator" skin being substantially eliminated.

In addition, the present invention contemplates the addition of a coloring material such as a pigment or dye to the material of the first layer prior to the time that the co-extrusion is formed so that in the final coextrusion product, when the rub rail member 110 is secured to the channel support member 120, the first layer 112 which is exposed presents an aesthetically pleasing appearance. Additionally, the present invention will encompass a first layer consisting of PVC material which has a high (large) gloss property so that the appearance and color of the first layer will further be enhanced.

In the preferred embodiment illustrated in FIG. 3, the first outer layer 112 is preferably formed with a thickness of about 0.020 to about 0.050 inches (about 20–50 mils) while the second inner layer 114 is preferably formed with a thickness of about 0.020 to 0.060 inches (20–60 mils), most preferably 0.040 to 0.045 inches (40–50 mils). Preferably, the thickness through both the first and second layers of the entire coextrusion is at any point no greater than about 0.080 inches (i.e., about 80 mils), and preferably is in the range of from about 0.040 to about 0.060 inches (about 40–60 mils).

Figure 4:
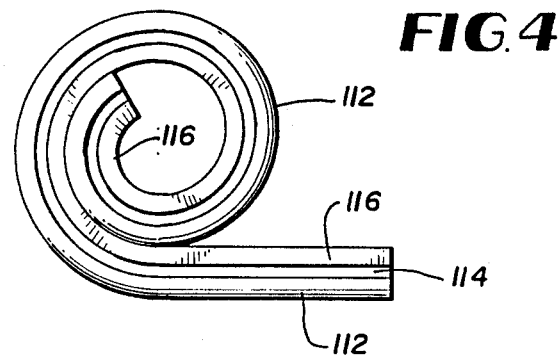
FIG. 4 is a side elevation view of the rub rail member shown in FIG. 3 partially unrolled from a coil thereof.

As a result of the first and second layers of the co-extrusion being formed with the thicknesses indicated above, the rub rail extrusion of the present invention enjoys yet another advantage over the rub rails of the known prior art. Unlike the rub rails of the prior art which after extrusion are cut into short lengths for purposes of shipping or storage, the rub rail extrusions of the present invention are coiled as shown in FIG. 4, for purposes of shipping or storage, to form hose-like, flexible members such that substantially greater lengths of extruded rub rail made in accordance with the teachings of the present invention can be stored in the same space as that required by the extrusions of the known prior art. This is possible in spite of the fact that the inner layer 112 is formed of rigid material because such layer is so thin. Installation of rub-rail from its coiled form is enhanced because larger lengths can be easily handled, and less end-matching is required.

Figure 5:
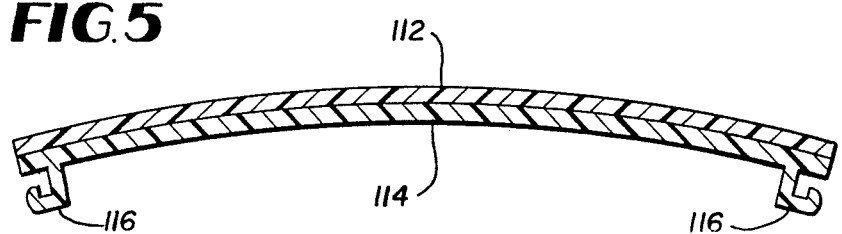
FIG. 5 is a transverse cross-section of the rub rail member of FIGS. 3 and 4 in its extruded form.

The rub rail member 110 is preferably extruded in a semi-flat or slightly curved form as shown in FIG. 5, although it may be extruded flat or in a more greatly curved form. During installation, the rub rail 110 flexed into the arcuate hemi-cylindrical configuration shown in FIG. 3. As illustrated in FIG. 3, the arcuately re-shaped rub rail member 10 is provided with a lateral width of a dimension sufficient to encompass substantially one-half the volume of a cylinder, i.e. about 180° in circumferential extent.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. An extruded rub rail member defining an axis of extrusion and being adapted for secure attachment to a well-mounted attachment means, the rub rail member comprising:
   a first portion having a predetermined width and a length extending in the direction of said axis of extrusion, said first portion including engaging means, carried by one surface, for engaging the wall-mounted attachment means;
   a second portion having a predetermined width and a length extending in the direction of said axis of extrusion, said second portion overlying and engaging the surface of said first portion disposed opposite to said one surface and being integral therewith;
   said first and second portions being disposed in contiguous engagement throughout their entire widths and lengths,
   said first portion consisting of a rigid plastic material, and said second portion consisting of a flexible plastic material,
   said rub rail member being sufficiently thin so as to be bendable in its widthwise direction to form an arcuate configuration and coilable in its lengthwise direction.

2. The extruded rub rail member of claim 1, wherein said plastic material of said second member includes a coloring material uniformly dispersed throughout.

3. The extruded rub rail member of claim 1, wherein said engaging means of said first member comprises a pair of arms spaced from one another and configured for engagement with the wall-mounted attachment means.

4. A rub rail member in accordance with claim 1, in longitudinally coiled form.

5. A rub rail member in accordance with claim 1, secured to the attachment means, and having an arcuate cross-sectional configuration.

6. A rub rail member having an elongated form and comprising:
   a thin upper layer of flexible plastic or elastomeric material having a durometer value of 65-95 Shore A and a thickness sufficiently small as to permit co-extrusion thereof in a consistent uniform fashion, said upper layer being regular and uniform without surface defects; and
   a thin lower layer of stiff plastic material having a durometer value greater than that of said flexible plastic and a thickness sufficiently small so that said rub rail member can be coiled longitudinally and flexed laterally;
   said upper layer and said lower layer being adjacent and overlying contiguous layers integral along coextruded faces thereof and having a combined thickness of no greater than about 80 mils.

7. A rub rail member according to claim 6 wherein said upper layer is formed of soft PVC and said lower layer is formed of hard PVC.

8. A rub rail member according to claim 6 wherein said upper layer has a thickness on the order of about 20-50 mils, and said lower layer has a thickness on the order of about 20-60 mils.

9. A rub rail assembly, comprising:
   a first extruded rub rail support member having an axis of extrusion and means extending normal to said axis of extrusion for attaching said first support member to a surface to be protected;
   a second extruded rub rail member engaged with said first extruded rub rail support member, said second rub rail member having an axis of extrusion disposed parallel to said axis of extrusion of said first rub rail member,
   said second rub rail member including two thin adjacent and overlying contiguous layers of plastic material having a combined thickness of no greater than about 80 mils,
   a first of said thin layers disposed closest to said first rub rail support member being secured to said first rub rail support member and consisting of a substantially rigid plastic material, a second of said thin layers disposed away from said first rub rail support member consisting of a substantially flexible plastic or elastomer material,
   the width of said second rub rail member being substantially more than the width of said first rub rail support member, such that when said first layer of said second rub rail member is secured to said first rub rail support member, said first and second layers of said second rub rail member are deformed arcuately about said axis of extrusion, and said second rub rail member delimits a cylindrical segment.

10. A rub rail assembly according to claim 9 wherein the first of said layers is formed of hard PVC and the second of said layers is formed of soft PVC.

11. A rub rail assembly according to claim 9 wherein said first of said layers has a thickness on the order of about 20-60 mils, and the second of said layers has a thickness on the order of about 20-50 mils.

12. An extruded rub rail member according to claim 1 wherein said first and second portions have a combined thickness of about 40-60 mils.

13. A rub rail member according to claim 6 wherein said upper layer and said lower layer have a combined thickness of about 40-60 mils.

14. A rub rail assembly according to claim 9 wherein said two thin adjacent and overlying contiguous layers have a combined thickness of about 40-60 mils.

* * * * *